June 16, 1953
R. A. ARTHUR
2,641,986
AUXILIARY PRESSURE RELIEF, VACUUM RELIEF, AND DUMP VALVE
Filed Dec. 20, 1948
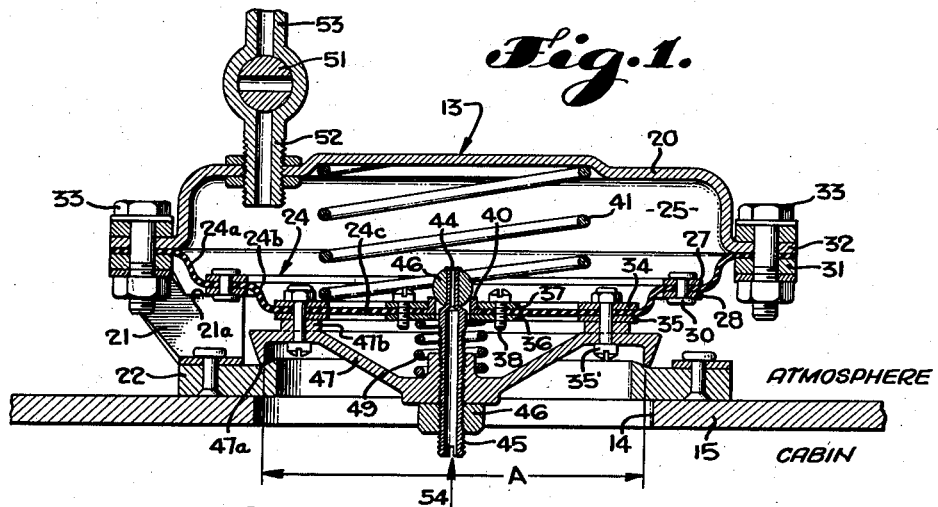
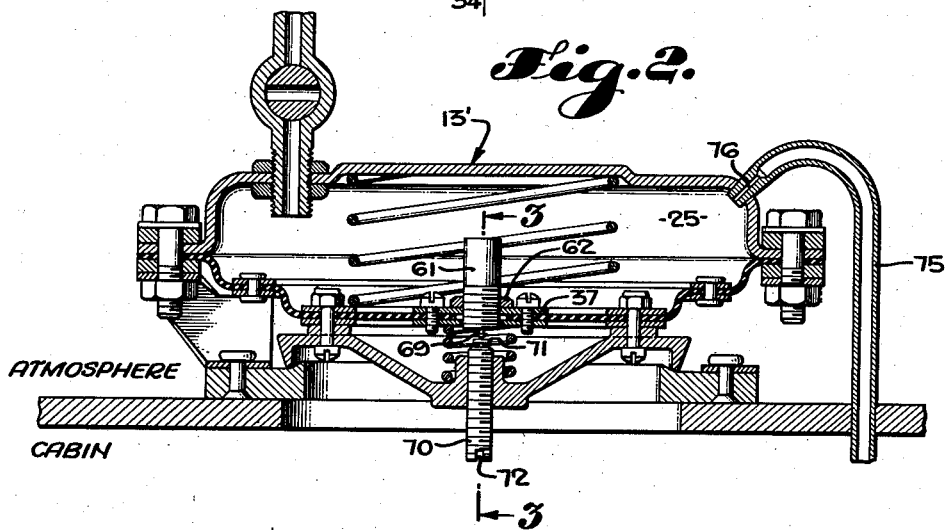
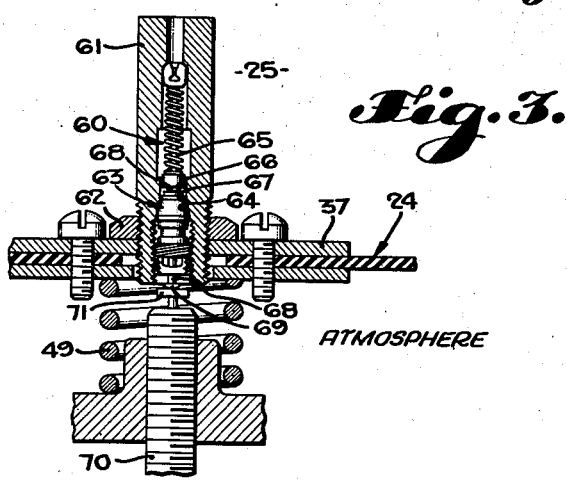
ROBERT A. ARTHUR,
INVENTOR.
BY John H. Wallace Patented June 16, 1953

2,641,986

UNITED STATES PATENT OFFICE 2,641,986

AUXILIARY PRESSURE RELIEF, VACUUM RELIEF, AND DUMP VALVE

Robert A. Arthur, Los Angeles, Calif., assignor to The Garrett Corporation, Los Angeles, Calif., a corporation of California Application December 20, 1948, Serial No. 66,155

10 Claims. (Cl. 98—1.5)

This invention relates in general to pneumatic valves, and more particularly to such valves of the type used in conjunction with pressurized vehicular compartments. It has particular application to the cabins of high altitude aircraft for the control of air pressure therewithin.

Aircraft designed for high altitude flight are generally equipped with means for pressurizing the cabin, including a supercharger for providing air under pressure to the cabin and a cabin pressure regulator for maintaining pressure in the cabin according to a predetermined schedule. In addition to the cabin pressure regulator it has become customary to provide auxiliary pneumatic valves which assume control of the cabin pressure under certain transient conditions. These auxiliary valves are of the nature of positive pressure relief valves for automatically venting cabin air to atmosphere when the differential between the pressure in the cabin and the surrounding atmospheric pressure approaches the unsafe structural limit of the aircraft, negative pressure relief valves for automatically allowing cabin pressure to equalize with atmospheric pressure when such atmospheric pressure becomes greater than that of the cabin, and dump valves for selective manual equalization of cabin pressure with atmospheric at the will of the pilot.

The combination of all these auxiliary relief functions into a single valve is an end to be desired, and such a combination valve is disclosed and claimed in the co-pending application for United States patent by Raymond W. Jensen, Serial No. 59,465, filed November 12, 1948. In the Jensen valve a flow valve member moves between open and closed positions in accordance with the movement of a movable wall which forms one side of a control pressure closed chamber. Cooperative control of the flow member by the movable wall is accomplished by a stem secured to the flow valve member, which stem extends into a central opening in the movable wall in a manner to cooperate therewith so as to provide pilot valve means for controlling pressure in the chamber. A compression calibrated spring disposed between the flow valve member and the movable wall governs the action of the pilot valve means and provides additional means for cooperative movement of the flow valve and the movable wall.

However, since the only support for the flow valve member (relative to the overall valve structure) is in the cooperation between the pilot valve members supplemented by the compressive force of the calibrated spring, it is seen that a tendency of the flow valve member to be displaced angularly from the axis of the valve structure might exist when the flow member returned to its seat after any of the three valve-open functions.

It is therefore an object of this invention to provide an improved Jensen type of valve structure by providing means whereby the axis of the flow valve member is substantially coaxial with the movable wall and associated pilot valve members at all times and under all conditions of valve operation.

It is another object of my invention to provide in a valve of the type to be described means for securing the flow valve member in a substantially rigid coaxial relationship with the pilot valve member associated with the movable wall of the closed chamber.

It is another object of the invention to secure the flow valve member directly to the movable wall in such manner that the movement of the wall will be communicated directly to the flow member.

Further objects and advantages of the invention herein disclosed will be apparent to those skilled in the art, upon reading the appended description and drawing.

Referring to the drawing, which is intended only to show a preferred means of practicing my invention and not to limit the invention to the structure shown or to the use hereinafter described, Fig. 1 is a cross-section view through the axis of my improved valve, as mounted on one wall of an aircraft cabin, Fig. 2 illustrates another embodiment of the valve employing an alternate pilot valve means, and Fig. 3 shows a detail cross-section of the alternate pilot valve means taken on the line 3—3 of Fig. 2, but showing the pilot valve means in open position.

Referring to Fig. 1, an auxiliary valve 13 is shown as mounted over a port 14 in a wall or bulkhead 15 of the pressurized cabin of an aircraft, atmospheric and cabin sides of the wall 15 being as shown. The valve 13 comprises a dished head 20 supported by means of a plurality of generally U-shaped struts 21 (only one of which appears in the view) in spaced relation to valve-seat ring 22 which is attached over the port 14 to the outside of the cabin wall or bulkhead 15 by bolts or other suitable means (not shown).

A diaphragm assembly, generally indicated at 24, constitutes a movable wall which defines one side of a chamber 25 which is the control chamber for the operation of the relief valve in its pressure relief, vacuum relief, and pneumatic dump functions. The assembly 24 comprises a single annular flexible diaphragm element which is divided into an outer portion 24a, a central portion 24b, and an inner portion 24c, the outer and central portions 24a and 24b being separated by a pair of rings 27 and 28 attached to the diaphragm by means of rivets 30. The outer periphery of the portion 24a is secured between a ring 31 and a flanged edge 32 of the head 20 by means of bolts 33, these bolts also serving to attach the head and diaphragm assembly to the struts 21. Movement of the rings 27 and 28 and of diaphragm portion 24a in a downward direction is arrested when the ring 28 comes to rest on the stop portions 21a of the struts 21.

The central and inner portions 24b and 24c of the diaphragm assembly are separated by a pair of rings 34 and 35 attached to the diaphragm by means of screws 35'. The inner periphery of the diaphragm portion 24c is secured between two disc-like plates 36 and 37 by screws 38, the plate 37 having a pilot valve member 40 affixed coaxially to its central portion. Preferably, the portion 24c is secured in a relatively taut condition in order that the member 40 will maintain substantially coaxial alignment with the rings 34 and 35, member 40 thereby being allowed a small amount of axial-wise movement due to the resilient nature of the diaphragm portion 24c. A light compression spring 41 is shown as disposed between the head 20 and the plate 34 in order to urge the movable wall of the chamber outwardly.

Communication between the enclosure and the control chamber 25 is provided by a restricted bleed passage or orifice 44 in a stem 45. Affixed on the uppermost end of the stem 45 is a spherical pilot valve seat member 46 which is adapted to receive the member 40 in seating engagement. It is now seen that communication between the cabin and the chamber 25 is provided by the control orifice 44 and that communication betwen the chamber 25 and the space outside the enclosure 10 is controlled by the pilot valve members 40 and 46.

The lower end of the stem 45 outside of the chamber 25 has threaded thereon a flow valve member 47, having a knife-edge seating rim 47a adapted to seat on the ring 22, and a locknut 48. Screws 35', in addition to clamping the rings 34 and 35 against the diaphragm, rigidly secure the member 47 to the diaphragm assembly, bosses 47b of the member 47 serving to maintain the upper face of member 47 in spaced relation to the ring 35 and thus allowing free communication between the atmosphere and the space between the diaphragm portion 24c and the valve member 47.

The area enclosed by the knife-edge rim 47a across the diameter A is substantially equal to the effective area of that part of the diaphragm assembly comprising diaphragm portion 24b, plates 34 and 35, diaphragm portion 24c, plates 36 and 37, and pilot valve member 40, for the purpose of achieving substantial balance of the pressures acting on the valve member 47 and diaphragm assembly 24 when the valve is closed.

Between the valve member 47 and the plate 36 is a calibrated compression spring 49 which tends to urge the pilot valve members 40 and 46 into seating relationship. Adjustment of the force of spring 49, which tends to seat the pilot valve members, is accomplished by the threaded relationship between stem 45 and valve member 47. Auxiliary means for controlling communication between the chamber 25 and the space outside is provided by a valve 51 and pipes 52 and 53. The pipe 52 may be of any convenient length in order that the valve 51 may be located either inside or outside the enclosure 10, as for example, where the valve 51 may be under the direct manual control of the pilot in an aircraft cabin. In such a case the pipe 52 would extend through the wall 15 to a point adjacent the aircraft pilot, where valve 51 woud be installed, and pipe 53 would extend from the valve 51 to any point providing access to the atmosphere. Upon opening of valve 51 direct communication would then be established between the chamber 25 and the atmosphere.

It is now apparent that the position of flow member 47 with respect to ring 22 is governed by the position within the chamber 25 of portions of the diaphragm assembly 24, particularly of the position of rings 34 and 35 together with diaphragm portion 24c. The sole function of spring 41, whose lower end rests on ring 34, is to seat the member 47 on the ring 22, which is the normal relationship of these two parts. Thus if the valve 13 were to be mounted overhead in a vertical position (substantially as shown in the figure), gravity alone would normally suffice to seat the member 47, and the spring 41 would be unnecessary.

As noted hereinabove, chamber 25 is normally subject to cabin pressure by virtue of the bleed passage 44. Since atmospheric pressure is usually lower than that of the cabin, it is apparent that pressure in chamber 25 tends to move the wall 24 outwardly, until the ring 28 rests on stops 21a and knife edge 47a of flow member 47 rests on ring 22. In the positive pressure relief operation of the valve 13 the pilot valve members 40 and 46 control the operation of the flow valve member by venting air from chamber 25 to atmosphere at a rate greater than air enters the chamber from the cabin through passage 44. That is, when atmospheric pressure is less than chamber pressure (which is substantially cabin pressure) by a differential predetermined by the adjustment of stem 45 in flow member 47, the differential sensed by the diaphragm portion 24c overcomes the force of spring 49 thereby causing the pilot valve member 40 to unseat from the seat member 46. Air in chamber 25 is thus vented to atmosphere, thereby lowering the pressure in the chamber. The lowered chamber pressure, exerted across the effective area of the central and inner diaphragm portions 24b and 24c, thus allows cabin pressure exerted across the face of flow member 47 to cause the flow member to move inwardly against the light force of spring 41 and thereby vent cabin pressure to atmosphere. As chamber pressure, which is still substantially that of cabin pressure, recedes below the above-mentioned predetermined differential, the force of spring 49 seats pilot valve member 40 on seat member 46. Additionally, since chamber and cabin pressures are equalized, the balance of pressures is restored as regards chamber pressure exerted across diaphragm portions 24b and 24c and cabin pressures exerted across flow member 47, thereby allowing the force of spring 41 to again seat flow member 47 on its seat on ring 22.

It will be noted in the above operation that chamber pressure is somewhat greater than that of atmosphere, hence the ring 28 continues to rest on the stops 21a and the diaphragm portion 24a does not influence the valve operation. However, in the event of a negative pressure differential, as for example if atmospheric pressure should become greater than cabin pressure (substantially chamber pressure), the differential thus created across the diaphragm portion 24a causes that portion to move inwardly and exert a tension on the portion 24c and hence on the flow member 47 which tension physically lifts the flow member off its seat against the light force of spring 41 and allows cabin pressure to equalize with atmospheric pressure. As pressure chamber 25 equalizes with cabin pressure, and hence that of the atmosphere, the spring 41 causes the flow member to seat. At such time as chamber pressure again resumes a normal differential over atmospheric pressure the ring 28 is caused to again rest on the stops 21a.

In the event that it is desired to "dump" cabin air, that is to equalize cabin and atmospheric pressures, it is only necessary to open valve 51. In that event the pressure in chamber 25 becomes immediately equalized with atmospheric pressure and the resultant differential between cabin and atmospheric pressures as exerted across opposing faces of flow member 47 causes the member to unseat against the light force of spring 41 and allow free communication between cabin and atmosphere. Closure of the valve 51 allows the spring 41 to again seat member 47. Other means for positive opening of the valve may include mechanical or electrical devices for applying a force on the stem 45 in the direction of the arrow 54. Such devices, which may be of the nature of a positioning jack, solenoid, lever and cam, etc., are well-known in the art and need no further explanation herein.

Referring to Figs. 2 and 3, the valve 13' conforms in general respects to the valve 13 of Fig. 1 with the exception that the pilot valve elements 40 and 46 and associated stem 45 with bleed passage 44 of Fig. 1 are replaced by alternate pilot valve means and by a separate bleed passage. In the alternate form, a replaceable valve core 60 is threadably received in a valve body 61 which is threaded into the plate 37 and locked thereto by means of nut 62. The core 60 is of the type well-known and generally utilized in the inner tubes of automobiles and other pneumatic-tired vehicles. Placement of the core 60 in the body 61, so that its wedge seal 63 intimately engages the tapered seat 64 in the body 61, causes the spring 65 to be compressed thereby urging the valve seat 66 into intimate sealing contact with the knife-edge obturating member 67 and thereby closes communication between the chamber 25 and the atmosphere external thereof. The valve stem 68 extends through the body of the valve core 60 and engages the seat 66 in such manner that a slight force exerted on the outside end 69 of stem 68 disengages the seat 66 from the member 67 against the force of spring 65 and opens communication through the body 61 between chamber 25 and the atmosphere external thereof.

Threaded into the valve member 47 is a screw 70 having a tip 71 adapted to engage the end 69 of stem 68 and unseat the valve elements 66 and 67 when the diaphragm assembly 24 moves toward the valve member 47 against the force of spring 49, in a manner as shown in Fig. 3. The other end of screw 70 has a screwdriver slot 72 for providing calibration adjustment of valve 13'. A conduit 75 having a bleed passage or orifice 76 provides restricted communication between the cabin and chamber 25.

In other respects, the operation of the valve 13' of Fig. 2 is similar to the operation of valve 13 of Fig. 1.

I claim:

1. A relief valve for controlling communication through a port in a wall of an enclosure, comprising: a flow valve member; a seat for said valve member; a closed chamber; a movable wall forming one side of the closed chamber, said wall dividing the chamber from a zone of lower pressure, said valve member being operatively secured to said wall; means dividing the movable wall into a plurality of separately movable portions, each of said portions being independently movable to effect movement of said valve member; stop means for arresting movement outwardly from said chamber of one of said dividing means; and means providing communication between said enclosure and said chamber.

2. A relief valve for controlling communication through a port in a wall of an enclosure, comprising: a flow valve member; a seat for said valve member; a closed chamber; a movable wall forming one side of the closed chamber, said wall dividing the chamber from a zone of lower pressure, said valve member being operatively secured to said wall; means dividing the movable wall into a plurality of separately movable portions, each of said portions being independently movable to effect movement of said valve member; stop means for arresting movement outwardly from said chamber of one of said dividing means; means providing restricted communication between said enclosure and said chamber; and valved conduit means for providing communication between said closed chamber and a zone of lower pressure.

3. A relief valve for controlling communication through a port in a wall of a pressurized enclosure, comprising: a flow valve member; a closed chamber; a movable wall forming one side of the closed chamber, said valve member being operatively secured to said wall; and pilot valve means operatively connected to and actuated by movement of said wall for controlling communication between the chamber and a zone of lower pressure.

4. A relief valve for controlling communication through a port in a wall of a pressurized enclosure, comprising: a flow valve member; a closed chamber; a movable wall forming one side of the closed chamber, said valve member being operatively secured to said wall; pilot valve means operatively connected to and actuated by movement of said wall for controlling communication between the chamber and a zone of lower pressure; and means providing communication between said enclosure and said chamber.

5. A relief valve for controlling communication through a port in a wall of a pressurized enclosure, comprising: a flow valve member; a closed chamber; a movable wall forming one side of the closed chamber, said valve member being operatively secured to said wall; means dividing the movable wall into a plurality of portions; stop means for arresting outward movement of one of said plurality of portions; normally closed pilot valve means operatively secured to said movable wall and controlling communication between said chamber and a zone of lower pressure; means for operating said pilot valve means; and means providing communication between said enclosure and said chamber.

6. A relief valve for controlling communication through a port in a wall of a pressurized enclosure, comprising: a flow valve member; a closed chamber; a movable wall forming one side of the closed chamber, said valve member being operatively secured to said wall; means dividing the movable wall into a plurality of portions; stop means for arresting outward movement of one of said plurality of portions; normally closed pilot valve means operatively secured to said movable wall and controlling communication between said chamber and a zone of lower pressure; means for operating said pilot valve means; means providing restricted communication between said enclosure and said chamber; and normally closed conduit means for providing communication at will between said closed chamber and a zone of lower pressure.

7. A relief valve for controlling communication through a port in a wall of a pressurized enclosure, comprising: a flow valve member; a closed chamber; a movable wall forming one side of the closed chamber; means dividing the movable wall into a plurality of concentric portions, said valve member being operatively secured to one of said dividing means; stop means for arresting outward movement of the outer of said plurality of portions; pilot valve means operatively associated with the flow valve member and said movable wall for controlling communication between said chamber and a zone of lower pressure; means normally urging said pilot valve means closed; and means providing restricted communication between said enclosure and said chamber.

8. A relief valve for controlling communication through a port in the wall of a pressurized enclosure, comprising: a flow valve member; a closed chamber; a movable wall forming one side of the closed chamber, said valve member being operatively secured to said wall; and pilot valve means for controlling communication between the chamber and a zone of lower pressure, said pilot valve means comprising support means associated with the movable wall of said chamber and removable valve core means disposed in said support means, said pilot valve means being operable by relative movements between the movable wall and the flow valve member.

9. A relief valve for controlling communication through a port in the wall of a pressurized enclosure, comprising: a flow valve member; a closed chamber; a movable wall forming one side of the closed chamber, said valve member being operatively secured to said wall; pilot valve means for controlling communication between the chamber and a zone of lower pressure, said pilot valve means comprising support means associated with the movable wall of said chamber and removable valve core means disposed in said support means, said pilot valve means being operable by relative movements between the movable wall and the flow valve member; and means providing communication between a zone of higher pressure and said chamber.

10. A relief valve for controlling communication through a port in a wall of a pressurized enclosure, comprising: a flow valve member; a closed chamber; a movable wall forming one side of the closed chamber; means dividing the movable wall into a plurality of portions, said valve member being operatively secured to one of said dividing means; stop means for arresting outward movement of the outer one of said plurality of portions; a pilot valve body secured in the movable wall; a normally closed pilot valve core disposed in the pilot valve body; means secured to said flow valve member for opening the normally closed pilot valve core; and means providing communication between a zone of higher pressure and said chamber.

ROBERT A. ARTHUR.

References Cited in the file of this patent

UNITED STATES PATENTS

| Number | Name | Date |
|---|---|---|
| 2,463,487 | Widgery et al. | Mar. 1, 1949 |
| 2,463,490 | Kemper | Mar. 1, 1949 |
| 2,463,492 | Arthur | Mar. 1, 1949 |
| 2,466,465 | Morris | Apr. 5, 1949 |
| 2,485,113 | Roth et al. | Oct. 18, 1949 |